United States Patent [19]

Clement et al.

[11] Patent Number: 4,593,971
[45] Date of Patent: Jun. 10, 1986

[54] CENTERING CELL FOR CONNECTING OPTICAL FIBERS

[75] Inventors: Jean-Joseph Clement, Vanves; Claude A. Lafuente, Carros, both of France

[73] Assignee: Les Cables de Lyon, Clichy, France

[21] Appl. No.: 503,197

[22] PCT Filed: Sep. 21, 1982

[86] PCT No.: PCT/FR82/00153
§ 371 Date: May 20, 1983
§ 102(e) Date: May 20, 1983

[87] PCT Pub. No.: WO83/01123
PCT Pub. Date: Mar. 31, 1983

[30] Foreign Application Priority Data

Sep. 23, 1981 [FR] France .................. 81 17953

[51] Int. Cl.$^4$ ........................... G02B 6/36
[52] U.S. Cl. .................. 350/96.20; 350/96.21
[58] Field of Search .............. 350/96.20, 96.21, 96.22

[56] References Cited

U.S. PATENT DOCUMENTS

| | | | |
|---|---|---|---|
| 4,061,416 | 12/1977 | Stewart | 350/96.21 |
| 4,087,155 | 5/1978 | Deacon | 350/96.21 |
| 4,184,741 | 1/1980 | Hawk et al. | 350/96.20 |
| 4,448,482 | 5/1984 | Lathlaen | 350/96.21 |

Primary Examiner—John Lee
Assistant Examiner—Lester Rushin, III
Attorney, Agent, or Firm—Sughrue, Mion, Zinn, Macpeak, and Seas

[57] ABSTRACT

The cell comprises around the end of an optical fiber (1) three resilient elongate rods having bulging ends and held clamped against the fiber by a cartridge (5) which is itself held in a cell body (9). Two identical cells can thus be placed face to face with a 1/6th of a turn offset to provide a quality junction, using a suitable connector of any type.

5 Claims, 9 Drawing Figures

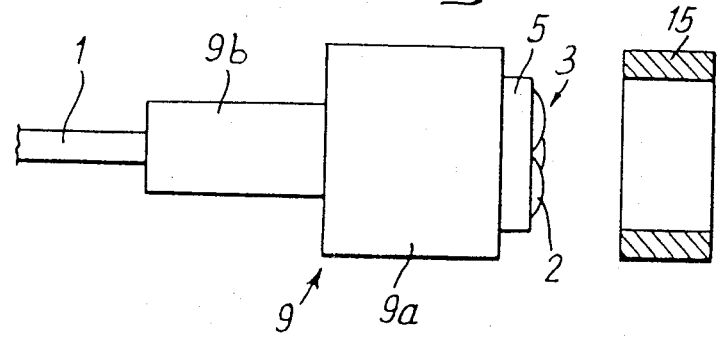
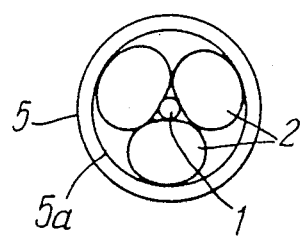
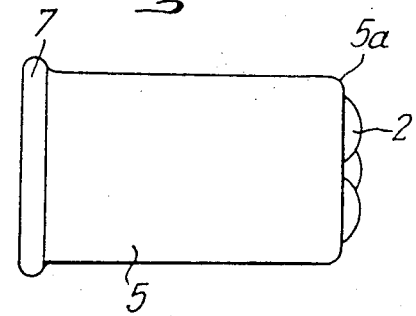
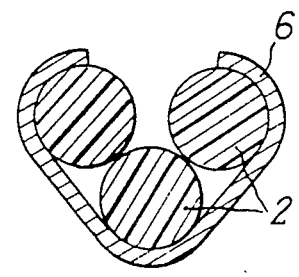
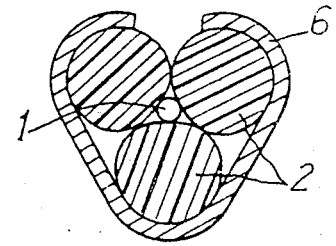
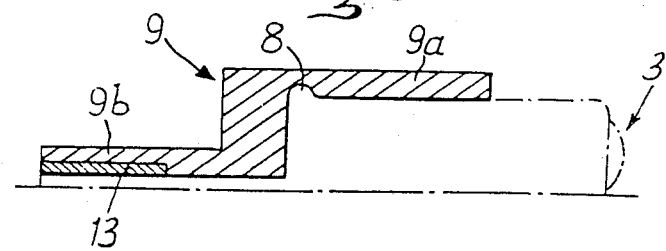

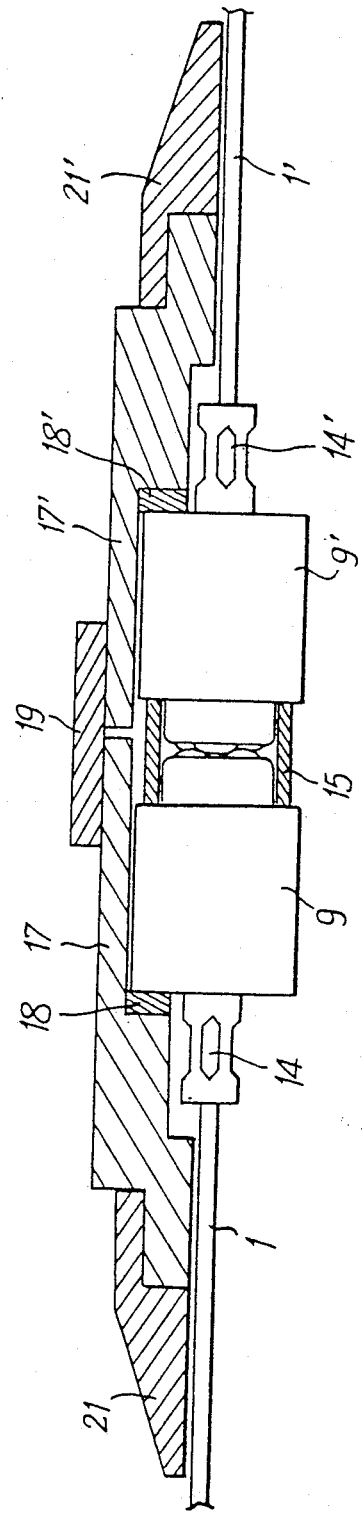
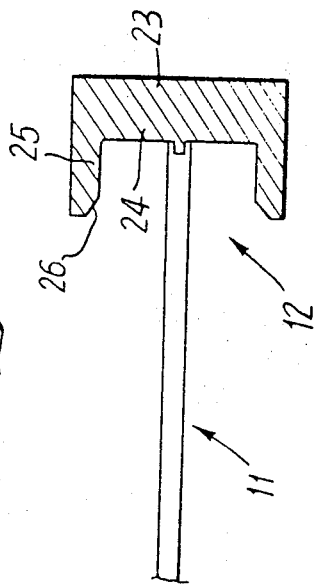
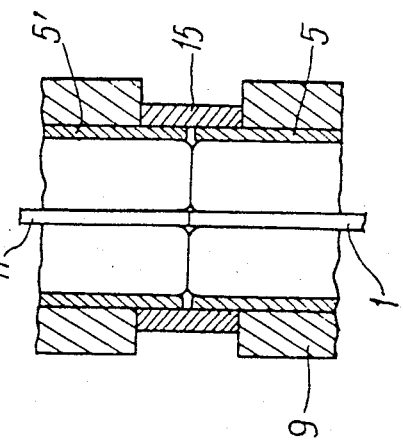

CENTERING CELL FOR CONNECTING OPTICAL FIBERS

The present invention relates to a centering cell for connecting optical fibers, in particular for connecting two optical fibers to each other, or for connecting an optical fiber to a light signal emitter or receiver. The invention also relates to a method and to a device for realising such a cell. The essential point is to keep the end of an optical fiber in a position which is axially and longitudinally defined in order to enable two fiber ends to be placed end-to-end to pass a signal under optimum conditions. The invention is especially applicable to small size optical fibers, eg. about 125 microns in diameter.

Optical fibers are extremely fragile, and preparing connections is delicate because of the high risk of breaking small diameter glass fibers.

Connection systems are known comprising a sleeve or block of rubber or other material having a narrow rectilinear passage therethrough. The ends of fibers to be connected are pushed in from each side until they come into contact. While centering is generally acceptable, this arrangement suffers from the drawback of not being separable and runs a high risk of fiber breakage during insertion.

Connector type systems are also known in which a fiber is held in the center of a connector by steel balls disposed in a plane parallel to the connection plane and close thereto. By placing two identical connectors opposite each other and face to face, the balls in each connector locate themselves between the balls in the other, thereby obtaining theoretically correct centering of one connector relative to the other. However, the contact pressure between the ends of the fibers is ill defined, and there is no guarantee that the fibers are centered in the middle of the balls.

The present invention provides a centering arrangement for connecting optical fibers which enables exact centering (to within allowable tolerances, ie. to within a few percent of a diameter), which blocks play to avoid any mechanical variation, and which ensures sufficient, but not excessive, contact pressure between the facing fiber ends. The arrangement in accordance with the invention enables the parallel and perpendicular axes at the end of each fiber to be aligned and also enables easy connection and disconnection of a fiber to another fiber or of a fiber to any board component, and hence, it enables connections to be modified. The invention also provides means (tooling and a method) for making a connection, both in a workshop and at a poorly equipped site.

According to the present invention this result is obtained by a centering cell which is remarkable particularly in that it includes at least three generally cylindrical packing pieces (or rods) disposed around the end of an optical fiber and having rounded ends adjacent the end of the fiber to be connected; at least one of the rods being made of resilient material, the rods being surrounded by a generally cylindrical retaining member or "cartridge", which may have an opening along a generator line, and the cartridge being kept compressed by a cell body in the form of a sleeve. The terms "rod", "cartridge", and "cell" are arbitrary and are used to simplify the explanation by avoiding the use of general terms. Naturally the use of such terms in no way limits the invention whose means are essentially defined by their functions or by their structure as described and claimed.

According to the invention, the above described cell is assembled using a tool comprising a center tube of suitable diameter for receiving a glass fiber, the cartridge is placed around the tube, the cartridge is compressed by engaging the cell body around the rods and the cartridge, then the optical fiber is engaged in the tube, and finally the tube is progressively removed once the fiber has reached its final position.

Advantageously, the tube is fixed to a cylindrical tool for receiving the cartridge. The tool with the tube may optionally be disposed of after an on-site assembly.

The tooling in accordance with the invention is particularly remarkable in that it includes a socket comprising a cylinder which is open at one end and at least partially closed at its other end, the diameter of the cylinder being chosen to receive the cartridge and to keep it clamped or compressed, a narrow tube being fixed on the axis of the socket and extending through the open end thereof.

In accordance with another characteristic in the method of performing the invention, the rods are placed around the tube with their rounded ends engaged in the socket, and the cartridge is placed around the rods by sliding the cartridge also into the socket. The assembly thus constituted may be used for placing a centering cell on the end of a glass fiber. The following operation are performed: the glass fiber is engaged in the tooling tube fitted out as described above; a cell body is placed around the cartridge; and the tooling is progressively removed by moving the socket away, thereby removing the tube; the rods clamp around the fiber as the tube is being removed.

Other characteristics of the invention will appear during the following description, which is given by way of non-limiting example with reference to the accompanying drawings, and which will make it readily understandable how the invention may be performed.

The drawings show:

FIG. 1 is an elevation view in partial section of a cell in accordance with the present invention;

FIG. 2 is an end view of a portion of a cartridge forming a centering cell in accordance with the invention, with an optical fiber or a tube at the center depending on the embodiment;

FIG. 3 is an elevation view of the FIG. 2 cartridge;

FIG. 4 is a similar view to FIG. 2, showing another embodiment before clamping;

FIG. 5 is a view corresponding to FIG. 4, showing the cartridge in the clamped state and with an optical fiber;

FIG. 6 is a section view through an example of a cell body;

FIG. 7 is a partial elevation view, partially in section, of a connected assembly in accordance with the present invention;

FIG. 8 is a partial section view in an axial plane through a connection in accordance with the invention; and FIG. 9 is a section view through an assembly tool.

A glass optical fiber 1 which is generally covered in a protective covering is shown in the drawings. The fiber may have a diameter of about 125 microns (or it may be much larger), and it is held in a centering cell by three rods 2 (ie. cylindrical packing pieces of small diameter and long relative to their diameter). In accordance with the invention the rods apply pressure on the fiber. To do this, the rods, or aleast one of them, should be made of resilient material. To ensure that the fiber is correctly held, there must be at least three rods: some other number may be chosen depending on the diameter of the fiber, but in general a larger number does not appear to be an improvement. The rods extend along the fiber up to its end, with the ends of the rods and of the fiber being in substantially the same plane. Advantageously, the ends of the rods are bulging, convex or rounded (as shown by arrows 3 in FIGS. 1 and 6). The end of the fiber is then situated in a plane slightly behind the tips of the rounded portions. These convex shapes leave concave shapes in between enabling two face-to-face cells to receive each other with 1/6th of a turn offset, thereby applying resultant forces which center the fibers relative to each other.

The rods themselves are held in place by a cartridge 5 (FIGS. 1, 2, 3 and 8) or 6 (FIGS. 4 and 5). The cartridge 5 is a simple cylinder with a deformation 5a for holding the rods and optionally including a rim 7 at the opposite end from the tips (see FIG. 3) enabling it to be fitted in a circular groove 8 in the body of the cell 9. An optical fiber 1 is shown in the center of FIG. 2, but it could equally be a tube for receiving an optical fiber, the tube being permanently fixed in the cartridge and extending over a portion of the length of the rods. In a variant, the cartridge 6 may be a cylinder which is split along a generator line (FIGS. 4 and 5), it may be of circular or other section which facilitates assembly given the very small size of the parts to be assembled. The split cartridge is provided with three rods as shown in FIG. 4. The cartridge envelope is made of material which must be permanently resilient in order to ensure constant pressure on the optical fiber. The material may be metal or plastic depending on the ambient conditions of use. The optical fiber 1, or the tube 11 of a tool 12 (shown in FIG. 6), or a permanently fixed tubular component is placed in the center, and the cartridge is then clamped to bring it to the position shown in FIG. 5.

To obtain a centering cell, a cell body 9, an example of which is shown in half section in FIG. 6, is placed around the cartridge. In order to place the cell body, it should be previously engaged around the fiber (if it is of any length) in order to avoid having to slide it over the entire length thereof. As shown in FIG. 6, the cell body comprises a large diameter portion 9a surrounding the cartridge and including a peripheral groove 8 for receiving the cartridge foot 7, and a small diameter portion 9b serving to guide and receive the optical fiber 1. Advantageously, the cell body is constituted of malleable material such as an alloy of bronze, tin, aluminum or the like, and the thin portion 9b may include a internal lining 13 of rubber or plastics material or the like to enable crimping 14 (see FIG. 7) to hold the fiber clamped without play.

In a variant, the cartridge and the cell body may be constituted by a single part.

In one embodiment of the present invention, two optical fiber ends may be connected end-to-end by placing two cells such as shown in FIG. 1 so that they face each other, and then pressing one against the other by means of a suitable connector which may be of any type including hermaphrodite (FIGS. 7 to 8), and which may optionally include a sleeve or centering ring 15 for adjusting the spacing. The use of a sleeve 15 and its size, where applicable, depend on the relative sizes of the cell body and the cartridge.

FIG. 7 shows a connector comprising two portions 17 and 17' which are held together by a coupling ring 19. Rubber sealing rings 18 and 18' may be provided. The details of the junction between the half-connectors are not shown since they are conventional and do not form part of the present invention. The half-connectors may be extended by flexible rubber tails 21 and 21' to limit fiber bending. The section of FIG. 8 schematically shows the flattening of the rounded heads of the rods under the effect of the tightening, and is naturally applicable to the case where all the rods are made of resilient material. In practice, a rod material must be found which is flexible enough for reasonable axial tightening to cause the volume to be partially filled by the flattening thereby producing converging forces tending the center the fiber axially.

FIG. 9 is a section through a tool 12 for assembling a cell in accordance with the invention. The tool comprises a socket 23 having a base 24 and a tubular portion 25 which is advantageously chamfered at 26 to facilitate cartridge insertion. To proceed with assembly, the tube 11 is inserted, for example, into the center of the cartridge 6 fitted with three rods and in the open position shown in FIG. 4. The cartridge is then closed (FIG. 5) and it is engaged in the socket 25 of the tool 12 by sliding along the tube 11. The length of the tube is a function of the length of the rods. A fixed tube may be provided during rod assembly. During assembly, the ends of the tube 11 are applied against the end of the fixed tube. The presence of a fixed tube over a portion of the length of the rods facilitates moving the fiber to adjust its longitudinal position during connection against another fiber. Then the cell body is engaged on the cartridge.

It is then possible to engage the optical fiber in the cell. Very often, the assembly thus constituted: the tool 12, three rods 2 and a cartridge 5 or 6 (with or without the cell body which can be placed at the last moment) may be taken to a site and readily put into place at the moment a coupling is made. This assembly thus constitutes one of the aspects of the invention. Its use avoids delicate on-site operations.

To put the optical fiber in place, it is inserted into the tube 11 (or into the fixed tube which precedes it) until it is stopped by the base of the tube. If the cell body is not in place, it is slid over the cartridge. The fiber is fixed to the cell body, eg. by deforming (crimping) while moving the socket 23 away. As the tube uncovers progressively more of the fiber, the rods clamp against the fiber to hold it in place. Once the tube is completely removed, the cell is in the situation shown in FIG. 1 (or 7).

A cell in accordance with the invention (or where appropriate a pair of cells) makes it possible to make a splice, or a separable connector assembly. Such a cell may be used to connect an input to one out of a plurality of outputs, or it may be incorporated in a movable switch in which it constitutes a link.

Naturally the embodiments described are only examples and could be modified without going beyond the scope of the invention, in particular by substituting equivalent techniques.

We claim:

1. A device for butt connecting a first optical fiber end to a second optical fiber end, said device comprising:

two identical centering cells, each cell receiving an optical fiber end and having a fiber receiving end and a connection end, each cell comprising at least three longitudinal, parallel and surface cylindrical abutting rods leaving an axial void therebetween for receiving an optical fiber, said rods being surrounded by a cartridge, said cartridge applying permanent pressure to the rods, at least one of said rods being made of a resiliently deformable material, the connection end of said rods being convex and the convex ends of said rods being in the same plane perpendicular to the rods, and means for inducing resilient forces tending to center the cells relative to each other when the cells are pressed axially together with their connection ends, one against the other, and the end of each optical fiber being in a plane rearward from the plane of the rod ends but close enough thereto for allowing both fiber ends to be applied one against the other when both cells are applied axially against each other, and wherein on the fiber entry end of said centering cells, the cell body includes a deformable portion 9b fitted with a flexible internal lining 13 for crimping to an optical fiber.

2. The device as claimed in claim 1, wherein said cells each include a central tube provided to receive an optical fiber with said central tube extending over a portion of the length of the rods at the fiber receiving end of the cell.

3. The device according to claim 1, wherein a cell body surrounds each cartridge.

4. The device according to claim 3, further comprising half connectors operatively engaging respective cell bodies, and means 19 for engaging respective half connectors and for fixing said half connectors to each other and for exerting an axial force urging said half connectors and said centering cells towards each other.

5. The device according to claim 1, further comprising an assembly member 12 constituted by a socket 23 surrounding each cartridge over a portion of its length from the connection end, an axial tube 11 being fixed to said socket and placed within the center of said rods with the diameter of the tube being such as to slidably receive an optical fiber.

* * * * *